March 6, 1928.
H. M. OLBRICHT
CONDENSING APPARATUS
Filed Nov. 23, 1926
1,661,265
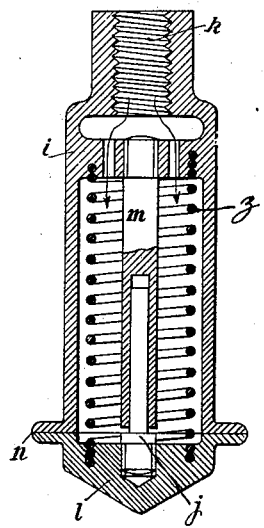
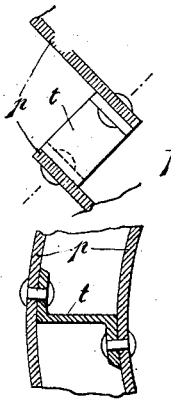
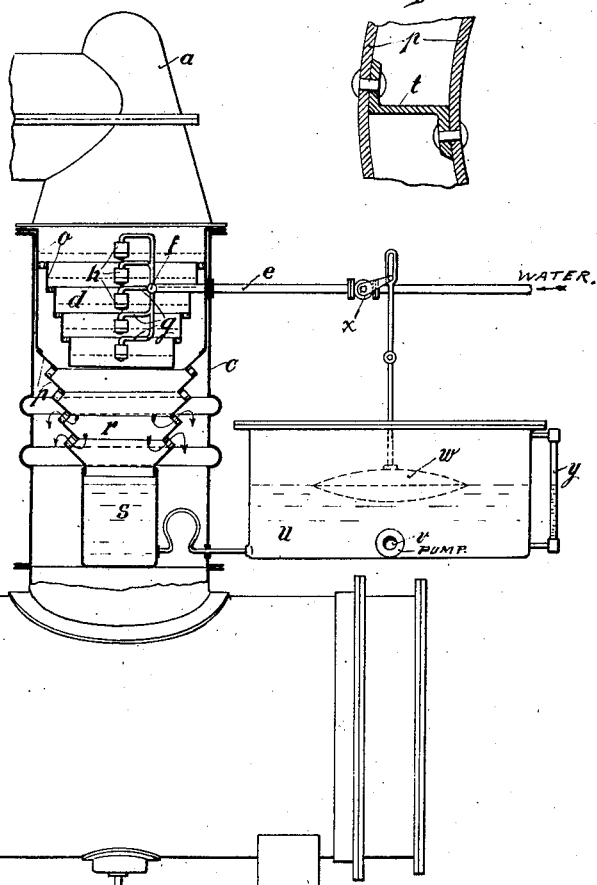
Heinrich Max Olbricht
INVENTOR Patented Mar. 6, 1928.

1,661,265

UNITED STATES PATENT OFFICE.

HEINRICH MAX OLBRICHT, OF BRUNN, CZECHOSLOVAKIA.

CONDENSING APPARATUS.

Application filed November 23, 1926, Serial No. 150,282, and in Czechoslovakia November 20, 1925.

The present day type of steam engines, such as steam turbines, requires very large surface condensers for the purpose of obtaining the necessary vacuum and great quantities of cold water are needed for the operation of such condensers. Frequently large quantities of cold water are not available and the water must be cooled in large cooling towers, Although a very good power yield is obtained by an arrangement of this kind, nevertheless considerable heat is lost through condensing the exhaust steam.

The object of the present invention is to extract a part of the heat contained in the exhaust steam and to utilize the same. This object is attained by the employment of an exhaust steam heat trap and, in operation, water is injected into the pipe connecting the engine and the condenser whereby a part of the exhaust steam is condensed while the rest of the steam, but not the water, flows to the condenser. This exhaust steam heat trap serves at the same time as a precondenser. The separation of the steam from the injected water and from the condensate is effected in a separator device which consists of a plurality of spaced telescopically arranged members P. These members are preferably of conical form and they are connected together by means of Z-irons. Connected to the series of members constituting the separator is a container for the condensate and injected water. Connected to and communicating with this container is a water reservoir from which the water is pumped to the point of utilization. Water injection is effected with the aid of a water film apparatus consisting of a plurality of individual spraying nozzles. Arranged in the water feed supply line leading to the film apparatus is a suitable valve which is actuated by a float in the water reservoir. This float prevents overflow of the container for the condensate and injected water. The nozzles consist each of two suitably guided parts which are pressed together by spring action. The pressure of the injected water overcomes the force of the springs and the two parts of the nozzle separate whereby an annular opening is formed. This annular opening may be either horizontal or inclined so that the water film is either plane or conical. The water issuing from the spraying nozzles strikes vertical impact surfaces and drops thence upon the separating device consisting of the conical members P. The impact surfaces are formed by a plurality of spaced telescoped cylinders which are arranged in the exhaust pipe. The separator unit made up of small conical members P is integral with the impact surfaces and this composite structure has a flange by which it may be positioned between the flanges of the two portions of the exhaust pipe. It does not project beyond the two flanges of the exhaust pipe so that the installation of the pipe between the engine and the condenser may be very easily effected.

The invention is illustratively exemplified in the accompanying drawing in which Fig. 1 is an assembled view partly in section; Fig. 2 is a sectional view of the spraying nozzle which I prefer to employ, and Fig. 3 is a detail in section of the separating device.

Referring to the drawings, $a$ is the exhaust branch of the engine, $b$ is the condenser which is here illustrated as a surface condenser, $c$ is the connection between $a$ and $b$ and is in the form of an expansion pipe. Arranged in the connection $c$ is the water film apparatus $d$ comprising the water feed pipe $e$, a distributing member $f$, the branch pipes $g$ and the spraying nozzles $h$ connected to the pipes $g$.

Referring to Fig. 2 showing the spraying nozzles on an enlarged scale it will be noted that each nozzle comprises a casing $i$ in which the feed pipe $g$ opens at $k$ and each spraying nozzle is provided with a cap $l$. Secured in the casing $i$ is a pin $m$ provided with a bore to receive a stud $j$ carried by the cap $l$. Between the casing $i$ and the cap $l$ is a spring $z$ the ends of which are secured to $i$ and $l$ respectively, the said spring holding the cap $l$ against the casing $i$.

As the injected water enters the casing $i$ at $k$ it expands the spring $z$ as a result of which the cap $l$ and casing $k$ are forced apart providing an annular opening or channel at $n$ through which the water issues in the form of a film. The water strikes the vertical impact surfaces $o$ and drops thence to the conical surfaces $p$ of the separator device $r$. The latter is connected with a container $s$ in which the condensate water mixed with the injected water accumulates, while the steam issues through the annular interstices between the conical members $p$ and passes thence to the condenser.

Fig. 3 discloses a detail of the device $r$ and it will be noted from this figure that the individual conical members *p* are connected together and spaced apart by the Z-irons *t*. The water reservoir *u* is connected to and communicates with the receptacle *s* and connected to the reservoir *u* is a pump *v*. Within the reservoir is a float *w* which actuates, through suitable linkage, the valve *x* in the feed pipe *e* leading to the water film apparatus. The water reservoir is preferably provided with the water gauge *y*.

Obviously the drawing merely shows one of the forms which the invention may take and modifications may easily be made, within the scope of the appended claims, by those skilled in the art.

The operation of the device will be understood from the following brief description thereof:

The exhaust steam must penetrate the films of injected water, the resulting hot mixture of injected water and condensate being capable of utilization either by having the hot water serve as feed water or being used for any other industrial purpose.

A further advantage of the present invention resides in the fact that the condenser of the engine may be materially smaller than heretofore without in any way detrimentally affecting the vacuum produced. The quantity of water which is circulated is also smaller than in the usual installations.

I claim:

1. An exhaust steam heat trap and condenser, comprising a casing, means for injecting water into the casing, vertically spaced cylindrical impact surfaces for injected water, and a separator below said impact surfaces, said separator comprising vertically arranged concentric conical surfaces spaced apart for permitting the passage of steam.

2. An exhaust steam heat trap and condenser, comprising a casing, means for injecting water into the casing, vertically spaced cylindrical impact surfaces for injected water, a separator below said impact surfaces comprising vertically arranged concentric conical surfaces spaced apart for permitting the passage of steam, a water container connected to the bottom of the separator, and a reservoir in communication with said container.

In testimony whereof I have affixed my signature.

HEINRICH MAX OLBRICHT.